US006185553B1

(12) United States Patent
Byrd et al.

(10) Patent No.: US 6,185,553 B1
(45) Date of Patent: Feb. 6, 2001

(54) SYSTEM AND METHOD FOR IMPLEMENTING COOPERATIVE TEXT SEARCHING

(75) Inventors: Roy Jefferson Byrd, Ossining, NY (US); James William Cooper, Wilton, CT (US)

(73) Assignee: International Business Machines Corporation, Armonk, NY (US)

( * ) Notice: Under 35 U.S.C. 154(b), the term of this patent shall be extended for 0 days.

(21) Appl. No.: 09/062,272

(22) Filed: Apr. 15, 1998

(51) Int. Cl.[7] .................................................. G06F 17/30
(52) U.S. Cl. .............................. 707/3; 1/4; 1/5; 1/6; 1/7; 1/10; 1/103
(58) Field of Search .................... 707/3, 4, 5, 6, 707/7, 100, 10, 103, 1; 709/227, 224; 395/200.49; 379/230; 345/329, 331, 339

(56) References Cited

U.S. PATENT DOCUMENTS

| | | | |
|---|---|---|---|
| 5,371,852 | * 12/1994 | Attanasio et al. | 709/245 |
| 5,535,386 | * 7/1996 | Wang | 707/203 |
| 5,710,884 | * 1/1998 | Dedrick | 709/217 |
| 5,717,869 | * 2/1998 | Moran et al. | 345/339 |
| 5,832,499 | * 11/1998 | Gustman | 707/103 |
| 5,850,442 | * 12/1998 | Muftic | 705/65 |
| 5,867,799 | * 2/1999 | Lang et al. | 707/1 |
| 5,872,923 | * 2/1999 | Schwartz et al. | 709/205 |
| 5,875,446 | * 2/1999 | Brown et al. | 707/3 |
| 5,893,117 | * 4/1999 | Wang | 707/203 |
| 5,983,214 | * 11/1999 | Lang et al. | 707/1 |
| 5,991,389 | * 11/1999 | Ram et al. | 379/230 |
| 5,995,610 | * 11/1999 | Smidt et al. | 379/207 |
| 6,029,161 | * 2/2000 | Lang et al. | 707/1 |
| 6,052,728 | * 4/2000 | Fujiyama et al. | 709/224 |

OTHER PUBLICATIONS

"Remote Computing, File Transfer and Voice Communications", http://www.artisoft.com/products.ns . . . 5319210725655b006bfd87?OpenDocument (No Publication Date Except Internet Print Date of Apr. 8, 1998) (pp. 1–2).

* cited by examiner

Primary Examiner—Thomas G. Black
Assistant Examiner—Diane D. Mizrahi
(74) Attorney, Agent, or Firm—Louis J. Percello; F. Chau & Associates, LLP

(57) ABSTRACT

Two or more client users, connected by one or more networks to the server, cooperatively search a database. The server has a data structure that has two or more cooperative user identifiers. Each cooperative user identifier represents one of the clients that has indicated a desired to establish a cooperative search. The data structure further has a session identifier that associates two or more of the cooperative user identifiers as session participants in an established a cooperative session. A command process, executing on the server, receives a query from one of the session participants (clients), accesses results of the query from a search engine, and distributes the results to all of the session participants. Queries of the cooperative session are related to indexed terms so that future uses will find this relationship when using similar queries. These are applications in searching for sales and service information.

9 Claims, 7 Drawing Sheets

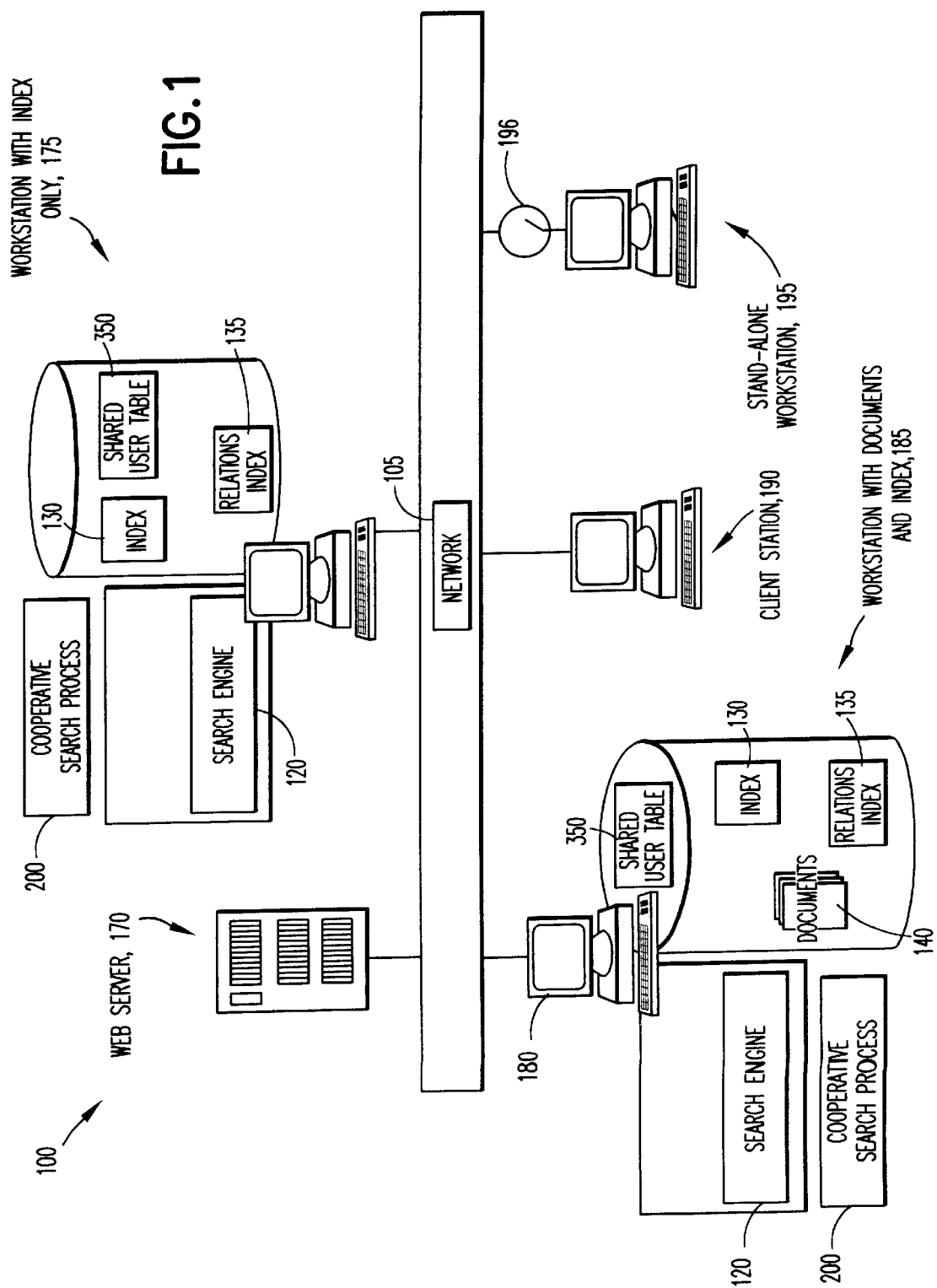

SYSTEM AND METHOD FOR IMPLEMENTING COOPERATIVE TEXT SEARCHING

FIELD OF THE INVENTION

This invention relates to the field of searchable digital libraries. More specifically, this invention relates to a system and method for two or more people to cooperate in searching a collection of digital documents.

BACKGROUND OF THE INVENTION

Regardless of the search technology being used, most search systems follow the same basic procedure for indexing and searching a hypermedia object database. First, the data to be searched must be input to the search system for indexing. Next, attributes and/or contents are extracted from the objects and processed to create an index. An index consists of data that is used by the search system to process queries and identify relevant objects. After the index is built, queries may be submitted to the search system. The query represents the user's information need and is expressed using a query language and syntax defined by the search system. The search system processes the query using the index data for the database and a suitable similarity ranking algorithm, and returns a hit-list of topically relevant objects. The user may then select relevant objects from the hit-list for viewing and processing.

A user may also use objects on the hit-list as navigational starting points. Navigation is the process of moving from one hypermedia object to another hypermedia object by traversing a hyperlink pointer between the objects. This operation is typically facilitated by a user interface that displays hypermedia objects, highlights the hyperlinks in those objects, and provides a simple mechanism for traversing a hyperlink and displaying the referent object. One such user interface is a Web browser. By navigating, a user may find other objects of interest.

In a networking environment, the components of a text search system may be spread across multiple computers. (For a more detailed description of these systems, see U.S. patent application Ser. No. 08/804,599, entitled "SYSTEM AND METHOD FOR HIERARCHICALLY GROUPING AND RANKING A SET OF OBJECTS IN A QUERY CONTEXT BASED ON ONE OR MORE RELATIONSHIPS" to Brown et al. filed on Feb. 24, 1997, now U.S. Pat. No. 5,875,446 which is herein incorporated by reference in its entirety.) A computer comprises a Central Processing Unit (CPU), main memory, disk storage, and software (e.g., a personal computer (PC) like the IBM ThinkPad). (ThinkPad is a trademark of the IBM Corporation.) A networking environment consists of two or more computers connected by a local or wide area network (e.g., Ethernet, Token Ring, the telephone network, and the Internet.) (See for example, U.S. Pat. No. 5,371,852 to Attanasio et al. issued on Dec. 6, 1994 which is herein incorporated by reference in its entirety.) A user accesses the hypermedia object database using a client application on the user's computer. The client application communicates with a search server (the hypermedia object database search system) on either the user's computer (e.g. a client) or another computer (e.g. one or more servers) on the network. To process queries, the search server needs to access just the database index, which may be located on the same computer as the search server or yet another computer on the network. The actual objects in the database may be located on any computer on the network.

A Web environment, such as the World Wide Web on the Internet, is a networking environment where Web servers, e.g. Netscape Enterprise Server and IBM Internet Connection Server, and browsers, e.g. Netscape Navigator and IBM WebExplorer, are used. (Netscape Navigator is a trademark of the Netscape Communications Corporation and WebExplorer is a trademark of the IBM Corporation.)

To create an index for a text collection in a Web networking environment, the prior art often uses Web crawlers, also called robots, spiders, wanderers, or worms (e.g., WebCrawler, WWWWorm), to gather the available objects and submit them to the search system indexer. Web crawlers make use of the (physical) hyperlinks stored in objects. All of the objects are gathered by identifying a few key starting points, retrieving those objects for indexing, retrieving and indexing all objects referenced by the objects just indexed (via hyperlinks), and continuing recursively until all objects reachable from the starting points have been retrieved and indexed. The graph of objects in a Web environment is typically well connected, such that nearly all of the available objects can be found when appropriate starting points are chosen.

Having gathered and indexed all of the documents available in the collection, the index can then be used, as described above, to search for documents in the collection. Again, the index may be located independently of the objects, the client, and even the search server. A hit-list, generated as the result of searching the index, will typically identify the locations and titles of the relevant documents in the collection, and the user will retrieve those documents directly with their Web browser.

Refinement of queries which start as one or two words frequently consists of discovering additional words which can be added to the query, and either adding them automatically or allowing users to decide whether to add them to refine the query further. When a collection of searchable data can be accessed by a number of users simultaneously, it is frequently the case that these users interests overlap. In addition, inexperienced users of a search system could learn to use it more effectively if they were guided by an experienced user or information retrieval professional.

STATEMENT OF PROBLEMS WITH PRIOR ART

Users who search data collections using Web browser or other on-line technology are given very little assistance in using the search tools effectively. Further, they have no way of taking advantage of related searches posed by other users either prior to or concurrent with their search. We are not aware of any current search engine technology that allows searches to cooperate and which allows search systems to learn from the user's queries.

OBJECTS OF THE INVENTION

An object of this invention is a system and method to allow several users to share their query strategies and intermediate results by indicating to the search system that they are interested in joining with others who are currently searching for similar information.

A further object of the invention is to allow this cooperative searching while preserving users anonymity.

A further object of this invention is a system which can deduce new relationships between search terms based on the results of these joint queries and add this learned information to its database to assist future users in finding similar information.

SUMMARY OF THE INVENTION

The present invention is a computer system/server and method that permits two or more client users, connected by one or more networks to the server, to cooperatively search a database. The server has a data structure that has two or more cooperative user identifiers. Each cooperative user identifier represents one of the clients that has indicated a desired to establish a cooperative search. The data structure further has a session identifier that associates two or more of the cooperative user identifiers as session participants in an established a cooperative session. A command process, executing on the server, receives a query from one of the session participants (clients), accesses results of the query from a search engine, and distributes the results to all of the session participants. In one embodiment of the invention, queries of the cooperative session are related to indexed terms so that future users will find this relationship when using similar queries. The invention has applications in searching for sales and service information.

BRIEF DESCRIPTION OF THE FIGURES

FIG. 1 shows a block diagram of a search system made up of a number of computers and indexes.

DETAILED DESCRIPTION OF THE INVENTION

Figure 2A:
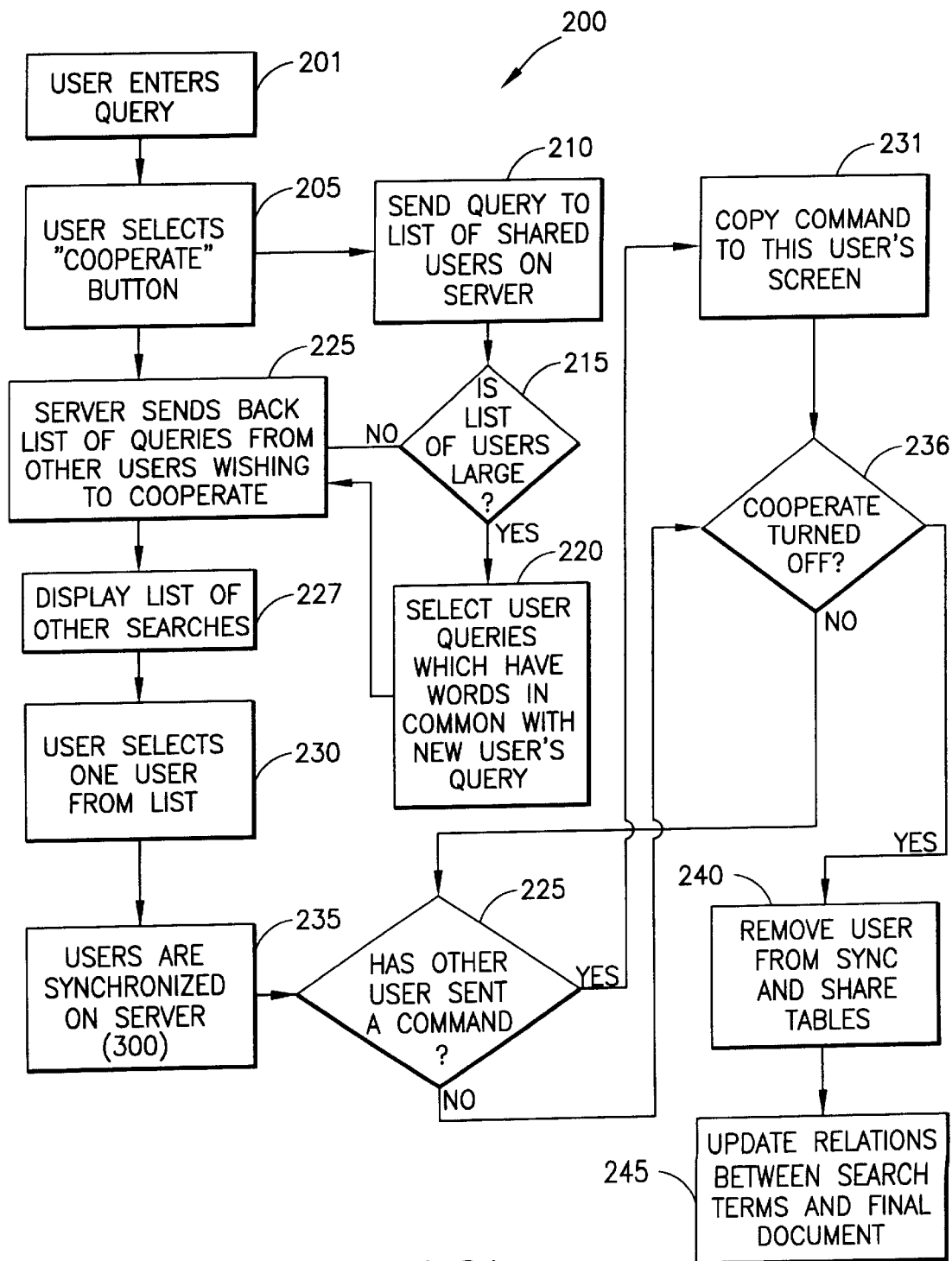
FIG. 2A is a flow chart of a cooperating search process.

FIG. 1 is a block diagram of the computing environment 100 in which the present invention is used in a non limiting preferred embodiment. The figure shows one preferred embodiment 100 of possible hardware, software, and networking configurations that make up the computing environment.

The computing environment or system 100 comprises one or more general purpose computers 170, 175, 180, 190, and 195 interconnected by a network 105. Examples of general purpose computers include the IBM Aptiva personal computer, the IBM RISC System/6000 workstation, and the IBM POWERparallel SP2. (These are Trademarks of the IBM Corporation.) The network 105 may be a local area network (LAN), a wide area network (WAN), or the Internet. Moreover, the computers in this environment may support the Web information exchange protocol (HTTP) and be part of a local Web or the World Wide Web (WWW). Some computers (e.g., 195) may occasionally or always be disconnected 196 from the network and operate as stand-alone computers.

To find a particular document (140) in the environment, a query (see FIG. 2) is submitted for processing to a topical search engine 120 running on a computer in the environment. The topical search engine 120 uses an index 130 to identify documents that are relevant to a query. The relevant documents (140) identified by the index 130 are ranked and returned by the topical search engine 120 in the form of a hit-list. The process is well known in the prior art. Examples of topical search engines include SearchManager/2 (a trademark of the IBM corporation.)

A relations index (135) establishes a relationship among terms that are within a given proximity in one or more of the documents and/or which have a relation established by one or more of the cooperative searches.

A novel cooperation search system/process (200) uses a table of cooperating/shared users (350) and other processes (300, 400) to establish one or more cooperative search sessions. See below.

FIG. 2 is a flow chart of a cooperative search process (200). The user enters a text query (201) into a user interface and then clicks on a button or other user interface element labeled "Cooperate" (205). This causes the query to be sent to the server, and instead of being executed, it results in the server returning a return list of the queries of other users (210) who have indicated that they are interesting in cooperating in their searches. Therefore the server tracks the users, and the queries of the users, that have indicated (205) that they want to cooperate. This is done by well known techniques, using a separate process for each user and a global table of users who have indicated an interest in sharing results.

If the return list of cooperating users is large (215), the server first filters it (220) by returning only those queries which have some non-stop words in common with the initial user's query (225). A stop word list is a term of art referring to a list of common words which are not indexed, such as common articles, conjunctions, and adverbs. In one preferred embodiment, a return list of more than 20 cooperating users is considered large. The criterion here is to return a number of queries from cooperating users that can be grasped easily by the user.

The user interface displays these queries in a list box (227), e.g. a window on the user interface (see FIG. 6), and invites the user to select one from that list. If the user selects a query (230), this information is sent back to the server (235) and the two users are now synchronized as described further in FIG. 3.

During the cooperative search process, either user may enter search information to refine the query, but only one user at a time can do so (see step 407 below). Each user's client interface periodically asks the server if there have been any changes (225) and if there have been the current state of the other user's search is copied to the first user screen (231). This process (200) continues, with either user able to submit additional refined searches until one of the users turns off his Cooperate button (236). When this occurs, the connection between the two users is broken at the server (240), by removing the shared identifier (360) from the shared users table (350).

This system utilizes a novel relations index (135) which can be used to propose additional search terms to refine a query (413). When the connection between the two users is broken, the system recognizes the end of a shared search and creates new relationships between the major key words identified in the final documents examined by the cooperating users and the terms in the original query posed by any of the cooperating users. These new relationships entered (245) in a relations index (135). This allows future users with similar queries to retrieve the same information more efficiently.

Thus, this system is in essence a learning system which creates new relationships between terms in the search query and those discovered in the final document the cooperating users find. In a preferred implementation, the users are asked to rate the value of this document to their needs and this rating weight is entered (not shown) in the relations table/index (135) as well.

Figure 2B:
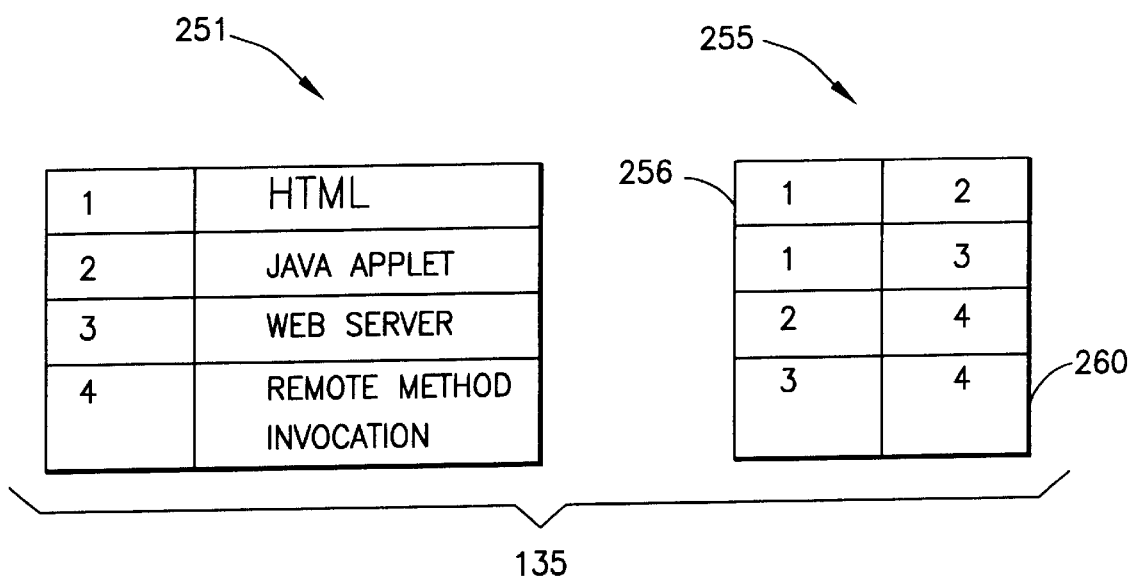
FIG. 2B is a block diagram of a relations table.

FIG. 2B shows a schematic representation of such a relations table system. The left table (251) shows a number a terms and their numeric keys. The right table (255) shows the relationships between these terms. For example, in the first entry (256), "1-HTML" is related to "2-Java applet."

The final entry in the table (260) shows that a relationship between "3-Web server" and "4-Remote Method Invocation" has been added to the relations list, as a result of a joint search such as we describe above.

Figures 3A, 3B:
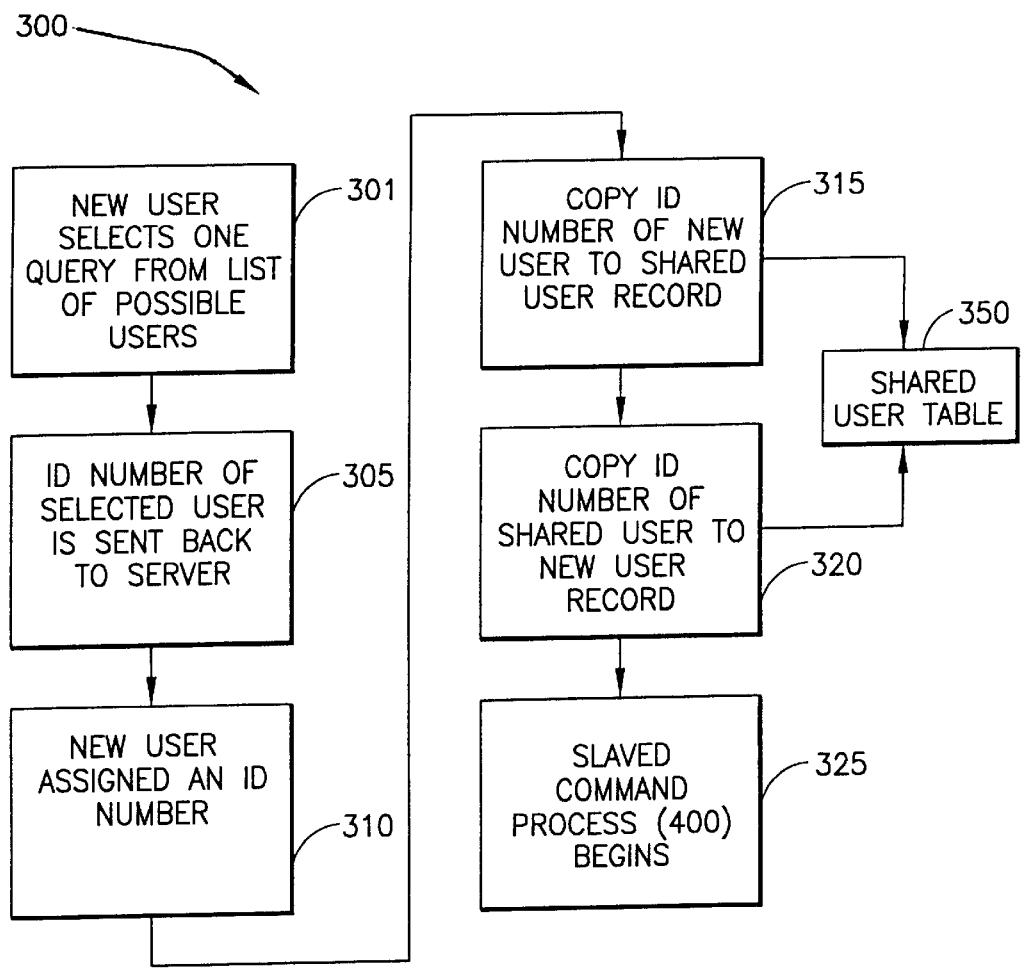
FIG. 3A shows a flow chart for how two search processes become synchronized.
FIG. 3B shows a block diagram of a table of cooperating users.

FIG. 3A illustrates the synchronization process (300). When a new user selects the Cooperate mode (205), the server assigns the user (310) an ID number and enters it (315) in the shared user table (350). The user selects (301) one query from the list of active user queries on the server and that user (320) is linked to the new user by having his ID marked as related to the shared user. This linking process is shown in the Shared User Table 350 in FIG. 3B. Then a slaved command process (325) begins. See FIG. 4. In FIG. 3B all of the users indicating interest in sharing their queries are listed in column 1 (355), and their initial queries in column 3 (370). Users 1, 3, and 5 are not sharing queries at the moment, but users 2 and 4 have been given Shared ID (360) (the number 1) and are thus linked together. Similarly, users 6 and 7 have been given Shared ID (the number 2), and are linked together. There is no technical limit on the number of users whose queries can be linked, but the practical limit is 2 or 3. Users who discontinue sharing have their Shared Ids (360) set back to zero, e.g., step (236).

Thereafter the search processes between the two users are synchronized. Each query and result is shown to all of the linked users. Nothing in this description precludes this synchronization from taking place between more than two users, but we restrict the description to two users here only for simplicity of the description.

Figure 4:
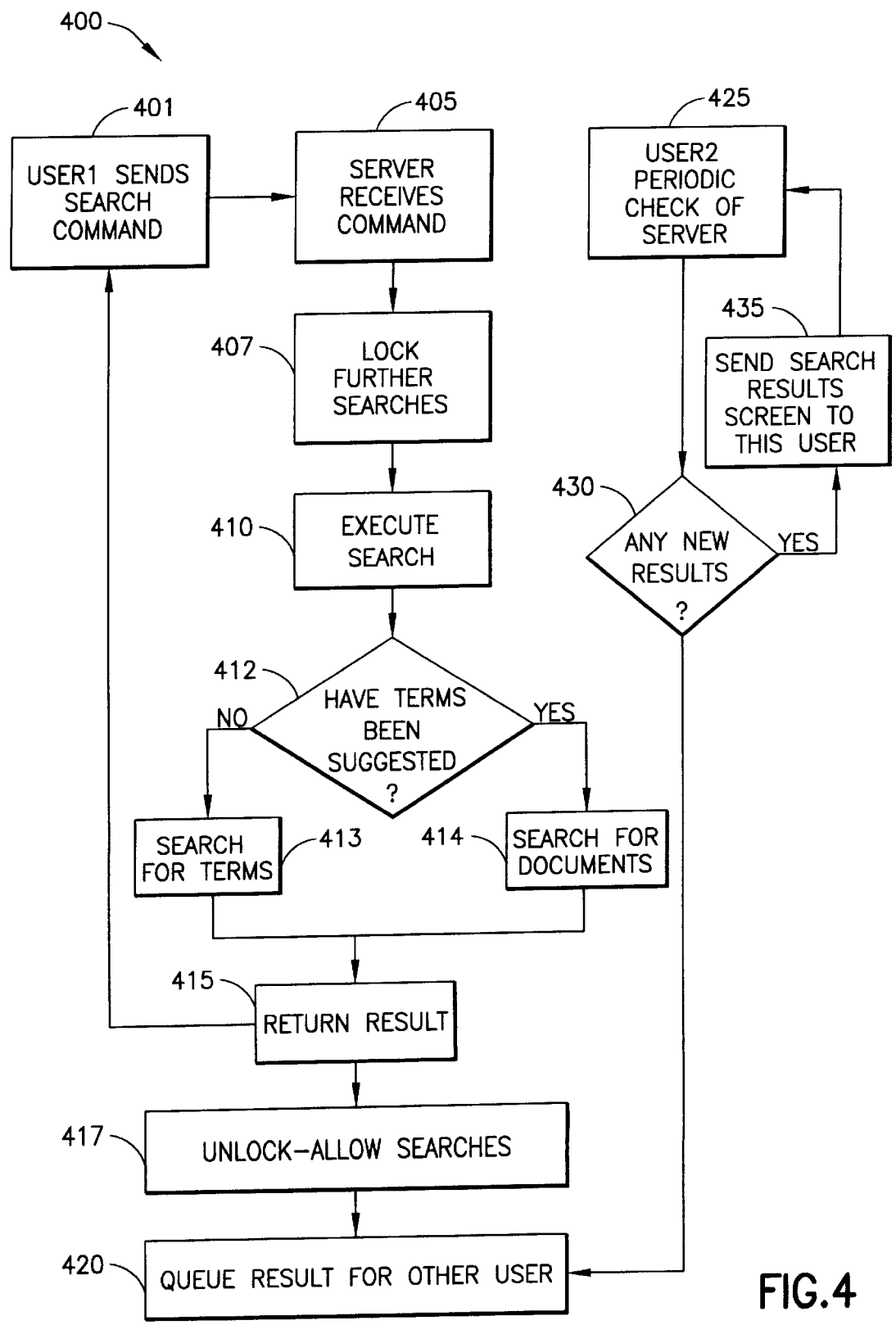
FIG. 4 shows a flow chart for how two search processes interact.

FIG. 4 illustrates how the search commands are linked between two users using process (400). User 1 sends a search command to the server (401). The server (405) receives the query and executes that search (410). The client program checks to see whether any related terms have yet been proposed to the user(s) (412) and if not, requests a search for related terms (413). If terms have already been proposed, the client requests a search for documents (414) using the current query.

During the time the search is taking place (407) the server prevents the other user from entering a conflicting query. It sends the result back to User 1 (415) and saves a copy for User 2. The search is then unlocked (417) so either user can now enter a command.

Figure 7:
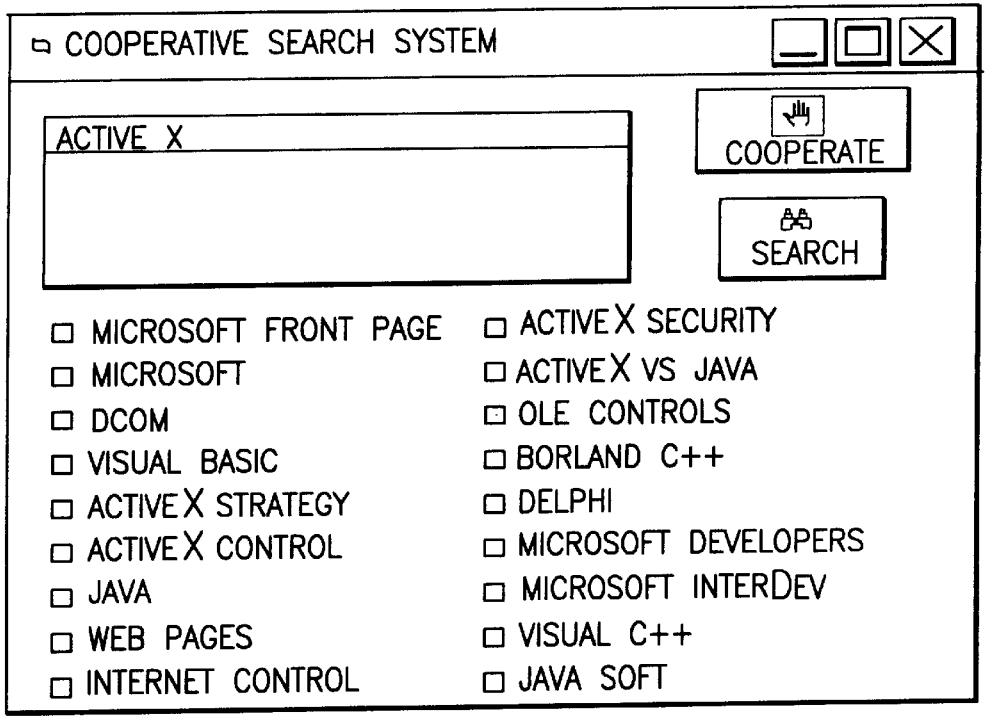
FIG. 7 shows a user interface for selecting related terms for refining a query.

This search (410) can either result in a list of documents or in a list of related terms which the indexing process has found commonly co-occur with the terms in the query. When the search results are returned, either user can modify the query either by typing in additional terms or by selecting them from a list of co-occurring terms (see FIGS. 7 and 8).

Each user's search client interface runs a background process (425) which sends a query to the server periodically to find out if any changes have taken place. If there are new results (430) they are copied to this users client screen as well (435). A non-limiting example of a shared search is now disclosed.

Figure 5:
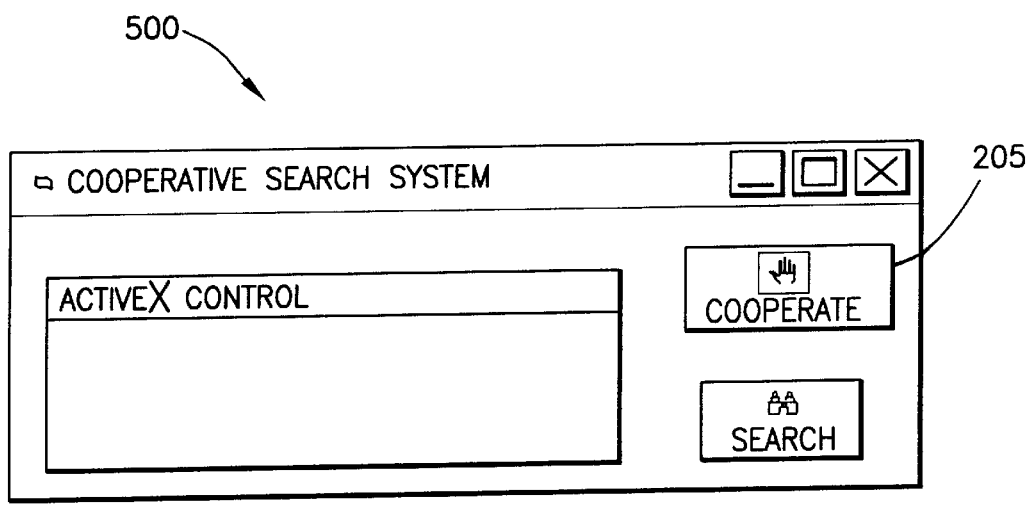
FIG. 5 show a typical user interface for entering a query.
Figure 6:
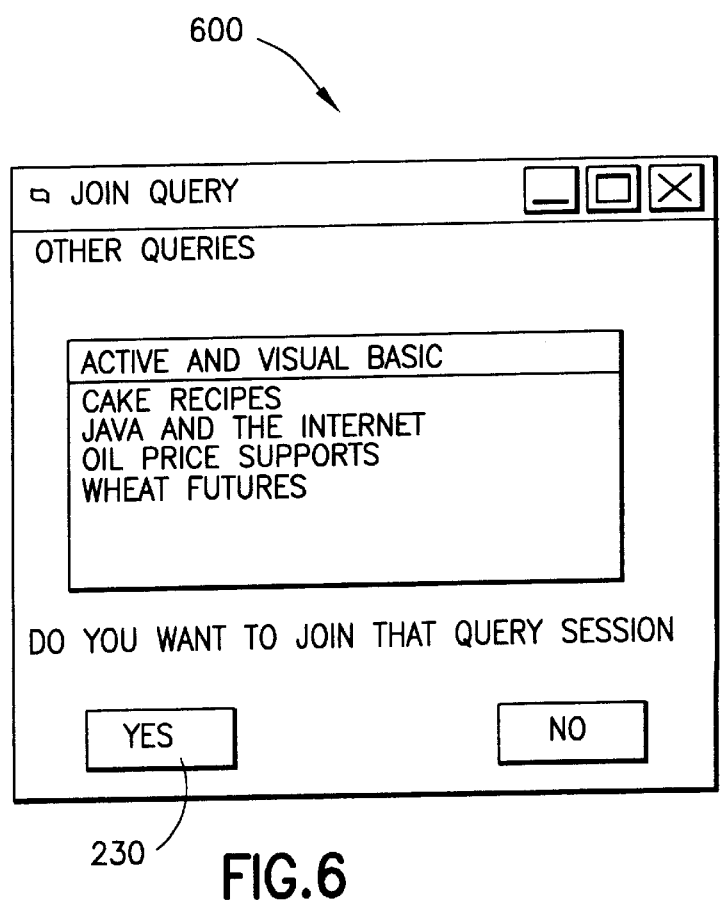
FIG. 6 shows how a user can be presented with other queries to join.

In one preferred implementation, the user's client search interface is written in the Java programming language and displayed on a web browser page. The server is also written in Java and the two communicate using a technique such as Java's Remote Method Invocation. Initially, a user begins a search using this search system interface (500) as shown in FIG. 5 entering the query "ActiveX controls." He then clicks on the "Cooperate" button (205), which tells the cooperative search server (210) to track his query. If there are only a few other users seeking to cooperate at that time, the search system displays all of the other queries on display 600 which are currently available to join (215, 225) as shown in FIG. 6.

If there are a large number of users seeking partners the system shows only those queries which have words in common with their own query (220, 225). If the user selects one of those queries and clicks on "Yes," (230) the two users' queries are synchronized (235), so that either can initiate searches or modify the search results and see the results of the other users' changes immediately. While having more than two users so linked is less likely, the system provides for it and will allow any number of users to cooperate. Once the users are joined, they see and can change a common set of terms on their screens. In the proposed system, users that pose simple queries (400) are presented with a list of additional multiword terms (413) that the indexing process has determined commonly co-occur with the terms in the user's query on the interface (700) shown in FIG. 7. This selection of multiword terms is described in U.S. patent application Ser. No. 09/033,154, docket number Y0998-039, entitled "Active Markup—A System and Method for Navigating Through Text Collections" filed on Mar. 2, 1998, now pending by James W. Cooper et al. which is herein incorporated by reference in its entirety.

Figure 8:
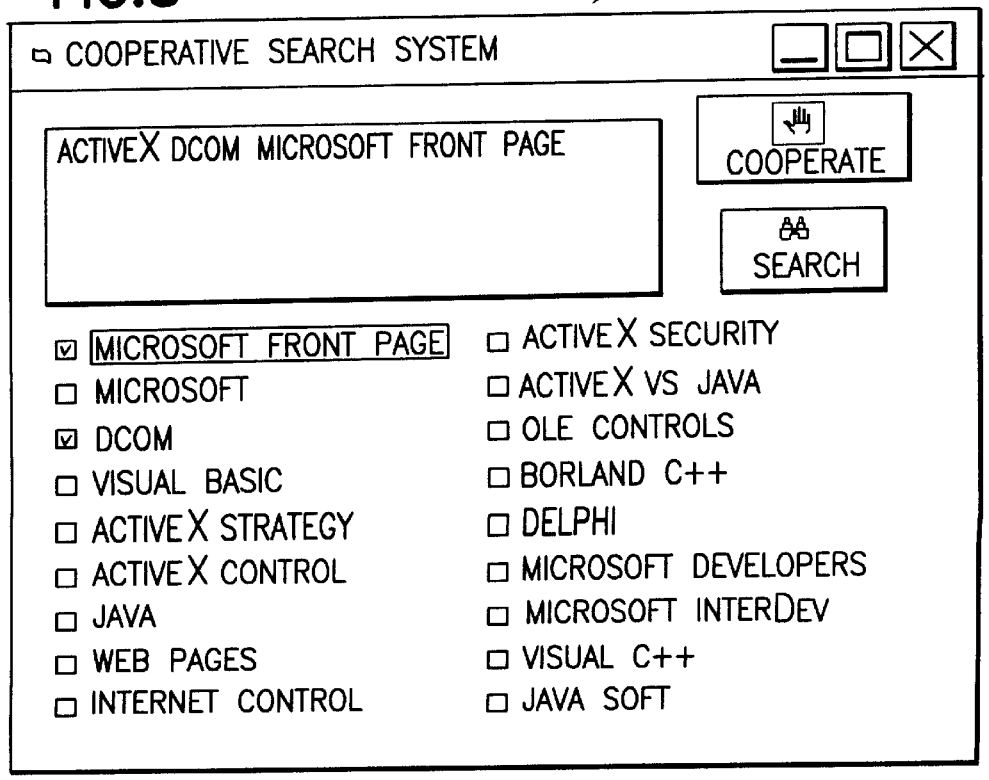
FIG. 8 shows a how the user interface in FIG. 7 allows additional terms to be added to a query.

The user, or any of the cooperating user can select from any of these terms and add them to the query and have these changes appear on each user's screen as shown on the interface (800) in FIG. 8.

Any user can then initiate a search by clicking on the Search button. This will bring up a ranked list of documents (414) that each user can select from and view. Additional cooperative changes are prevented from taking place until each user has closed the document list. Then, any user can revise the query further by clicking on additional terms or typing others in. The cooperative query mode persists until users turn off their "cooperation" button, or clear the screen to begin a new search. Non-limiting uses of the invention are as follows:

1. Users of search tools on the World Wide Web can join forces to find information more rapidly. Users can indicate an interest in sharing search criteria (even anonymously) and arrive at useful results more effectively.

2. Service people can assist users in formulating more effective queries:

Users can search for information on corporate intranets with help from a professional information expert. Experts can help by inserting additional keywords that they know bring up helpful information.

Librarians can help remote customers find information in their collection or related to their collection electronically over the Internet. Librarians can use their overall knowledge of their collection to guide the users by proposing additional query terms.

One service function would be performed by travel agents who would cooperate with clients to find travel information over a network.

4. Sales people can help guide customers to choose the product that suits them best.

Automobile salesmen can help customers electronically choose an automobile with the set of technical and style features that they most need. They can add features or model names that the customer may not be familiar with.

Waiters can help customers choose menus, even before they arrive. They can use the system to show the customer menu combination they had not considered.

Clothing sales people can help customers find styles and colors of clothing more effectively, even before the visit the store. They can help establish links between articles carried in different departments to add to complete the customer's wardrobe.

5. Law enforcement officers can assist each other in locating or eliminating suspects by searching law enforcement data together.

1. Attorneys and paralegal workers can work together across a network to find relevant case law and precedents by jointly searching legal databases for information relevant to cases each of them are working on.

2. Newspaper and magazine reporters can assist each other in searching for background information to support stories each of them may be working on.

We claim:

1. A computer server connected to one or more networks through a network interface, each of the networks connected to one or more clients, the server comprising:

a data structure that has two or more cooperative user identifiers, each cooperative user identifier representing one of the clients that indicated a desire to establish a cooperative search, the data structure further having a session identifier that associates two or more of the cooperating user identifiers as session participants in a cooperative session identified by the session identifier; and a command process, executing on the server, that receives a query from one of the session participants, accesses results of the query from a search engine, and distributes the results to all of the session participants.

2. A computer server connected to one or more networks through a network interface, each of the networks connected to one or more clients, the server comprising:

a data structure that has two or more cooperative user identifiers, each cooperative user identifier representing one of the clients that indicates a desire to establish a cooperative search, the data structure further having a session identifier that associates two or more of the cooperative user identifiers as session participants in a cooperative session identified by the session identifier, one or more queries of one or more of the session participants being stored in the data structure;

a searchable database with a terms index of terms indexing a plurality of documents;

a relations table that stores relationships between terms in the terms index; and a command process, executing on the server, that receives a query from one of the session participants, accesses results of the query from a search engine, distributes the results to all of the session participants, and establishes a relationship in the relations table between one or more of the queries and one or more of the terms.

3. A computer server, as in claim 2, where one or more of the terms are multiword terms.

4. A computer server, as in claim 2, where one or more of the queries is a query about a product.

5. A computer server, as in claim 4, where the product is any one or more of the following: an item of clothing, an automobile, and one or more food items.

6. A computer server, as in claim 4, where one or more of the queries is a query about a service.

7. A computer server, as in claim 6, where the service is any one or more of the following: a legal search, an information search, a search of newspaper articles, a search of periodical articles, a search for an opinion of an expert, a search for travel information, and a search for library information.

8. A method of searching a database on a computer network comprising the steps of:

receiving one or more requests from one or more clients on the computer network to be participants in a cooperative search;

assigning a cooperative user identifier to each participant;

assigning a session identifier that associates the cooperative user identifiers with a session;

receiving one or more queries from one or more of the participants;

accessing results of one or more of the queries from one or more search engines; and distributing the results to all of the participants in the session.

9. A system for searching a database on a computer network comprising the steps of:

means for receiving one or more requests from one or more clients on the computer network to be participants in a cooperative search;

means for assigning a cooperative user identifier to each participant;

means for assigning a session identifier that associates the cooperative user identifiers with a session;

means for receiving one or more queries from one or more of the participants;

means for accessing results of one or more of the queries from one or more search engines; and means for distributing the results to all of the participants in the session.

* * * * *